US007698493B2

(12) United States Patent
Asaro

(10) Patent No.: US 7,698,493 B2
(45) Date of Patent: Apr. 13, 2010

(54) METHODS AND APPARATUS FOR TRANSLATING WRITE REQUEST MESSAGES IN A COMPUTING SYSTEM

(75) Inventor: Anthony Asaro, Toronto (CA)

(73) Assignee: ATI Technologies, Inc., Markham, Ontario (CA)

(*) Notice: Subject to any disclaimer, the term of this patent is extended or adjusted under 35 U.S.C. 154(b) by 546 days.

(21) Appl. No.: 11/162,169

(22) Filed: Aug. 31, 2005

(65) Prior Publication Data
US 2007/0055808 A1 Mar. 8, 2007

(51) Int. Cl.
G06F 13/42 (2006.01)
G06F 13/20 (2006.01)
G06F 13/36 (2006.01)

(52) U.S. Cl. ................. 710/315; 710/105; 710/313
(58) Field of Classification Search ........... 710/313, 710/315, 105
See application file for complete search history.

(56) References Cited

U.S. PATENT DOCUMENTS

| 5,961,621 | A  | * | 10/1999 | Wu et al. .............. 710/107 |
| 6,226,704 | B1 | * | 5/2001  | Wang et al. ........... 710/310 |
| 6,230,227 | B1 | * | 5/2001  | Fry et al. .............. 710/314 |
| 6,298,407 | B1 | * | 10/2001 | Davis et al. ........... 710/314 |
| 6,301,632 | B1 | * | 10/2001 | Jaramillo ............. 710/105 |
| 6,434,636 | B1 | * | 8/2002  | Van Gaasbeck ....... 710/33 |
| 6,449,678 | B1 | * | 9/2002  | Batchelor et al. ..... 710/310 |
| 6,502,157 | B1 | * | 12/2002 | Batchelor et al. ..... 710/310 |
| 6,684,284 | B1 | * | 1/2004  | Lai et al. ............. 710/305 |
| 6,988,161 | B2 |   | 1/2006  | McConnell et al. |
| 6,996,659 | B2 | * | 2/2006  | Lupien et al. ......... 710/315 |
| 7,003,615 | B2 | * | 2/2006  | Chui et al. ........... 710/311 |
| 7,024,503 | B2 |   | 4/2006  | Peng |
| 7,032,060 | B2 |   | 4/2006  | Yu et al. |
| 7,065,597 | B2 | * | 6/2006  | Kumar et al. ......... 710/260 |
| 7,088,726 | B1 |   | 8/2006  | Hamamoto et al. |
| 7,146,451 | B2 | * | 12/2006 | Boily ................. 710/310 |

(Continued)

OTHER PUBLICATIONS

Alliance Semiconductor, AS90L 10204 HyperTransport tm to PCI-X Bridge, User's Manual, Jul. 16, 2004, pp. 1-35,62,104.*

(Continued)

Primary Examiner—Mark Rinehart
Assistant Examiner—Christopher A Daley
(74) Attorney, Agent, or Firm—Vedder Price, P.C.

(57) ABSTRACT

Methods and apparatus are disclosed to translate memory write requests to be transmitted from a first processor to a second processor in a computing system, such as between a CPU and a Southbridge, as an example. A method includes generating a memory write request in a second protocol responsive to a memory write request of a first protocol, the first protocol supporting a first memory write command type and a second memory write command type, the second protocol supporting only the first memory write command type. The method also includes inserting a predefined code in the memory write request in the generated memory write request in the second protocol to produce a translated memory write request. The method may also include receiving the memory write request from the first processor where the memory write request is operable according to the first protocol having at least first and second memory write command types. The predefined code in the received memory write request is then used to determine the type of memory write request (posted or non-posted).

25 Claims, 2 Drawing Sheets

U.S. PATENT DOCUMENTS

| | | | |
|---|---|---|---|
| 7,194,607 B2 | 3/2007 | Dahlen et al. | |
| 7,315,912 B2* | 1/2008 | Reed | 710/310 |
| 2003/0163590 A1* | 8/2003 | Cheng | 709/250 |
| 2003/0188071 A1 | 10/2003 | Kunjan et al. | |
| 2003/0200383 A1* | 10/2003 | Chui et al. | 711/112 |
| 2004/0024949 A1* | 2/2004 | Winkler et al. | 710/315 |
| 2004/0109473 A1 | 6/2004 | Lebizay et al. | |
| 2004/0186942 A1* | 9/2004 | Olarig | 710/313 |
| 2005/0223124 A1* | 10/2005 | Reed | 710/5 |
| 2005/0235092 A1 | 10/2005 | Ballew et al. | |
| 2006/0101179 A1* | 5/2006 | Lee et al. | 710/113 |
| 2006/0173986 A1* | 8/2006 | Ikeda et al. | 709/223 |

OTHER PUBLICATIONS

HyperTransport Technology Consortium, HyperTransport I/O Link Specification Revision 1.10, Aug. 25, 2003, pp. 1-57.*

"HyperTransport™ I/O Link Specification, Revision 1.05c"; Document #HTC2002104-0005-0005; Aug. 5, 2003; HyperTransport Technology Consortium.

"Advanced Configuration and Power Interface Specification, Revision 2.0b;" Oct. 11, 2002; Compaq Computer Corporation, Intel Corporation, Microsoft Corporation, Phoenix Technologies Ltd., and Toshiba Corporation.

"AMD-8151™ HyperTransport™ AGP3.0 Graphics Tunnel Data Sheet;" 24888 Rev 3.03-Jul. 12, 2004; Advanced Micro Devices, Inc.

"Clock Generator Specification for AMD64 Processors;" Publication #24707 Revision: 3.08; Sep. 2003; Advanced Micro Devices, Inc.

"HyperTransport™ Technology I/O Link—A High-Bandwidth I/O Architecture;" Jul. 20, 2001; Advanced Micro Devices, Inc.

Intel; Intel Low Pin Count (LPC) Interface Specification; Aug. 2002; Revision 1.1; pp. 1-54.

HyperTransport Technology Consortium; HyperTransport I/O Link Specification Revision 1.10; pp. 33-48, 144, 190, 204-209, Aug. 25, 2003.

HyperTransport Technology Consortium; HyperTransport I/O Link Specification Revision 1.10; pp. 1, 3, 142-152, 190, 220, Aug. 25, 2003.

PCI Express Base Specification Revision 1.1; Mar. 28, 2005; pp. 1-508.

* cited by examiner

METHODS AND APPARATUS FOR TRANSLATING WRITE REQUEST MESSAGES IN A COMPUTING SYSTEM

FIELD OF ENDEAVOR

The present disclosure relates to methods and apparatus used to translate messages within a computing system and, more particularly for translating types of write message requests formatted according to one protocol to another protocol in order to transmit the write message requests.

BACKGROUND

In certain types of computing systems that include a central processing unit (CPU) and a host bridge or what is known as a "Northbridge," such devices are connected by an interface using a particular protocol in order for the CPU and Northbridge to communicate. One such protocol known in the art is HyperTransport™, which provides a high speed, point-to-point link for interconnecting integrated circuits within a computing system. Typically, however, Northbridge circuits communicate with other devices in the system, such as input-output bridges (e.g., a "Southbridge") according to different protocols, including PCI Express. Different protocols may use different packet formats and different commands in the packets. Accordingly, when a CPU is trying to communicate with a Southbridge via the Northbridge and the CPU communicates with the Northbridge via HyperTransport™ protocol and the Northbridge, in turn, communicates with the Southbridge via PCI Express protocol, not all message types or packet formats are easily passed through the Northbridge to communicate the commands in requests (e.g. packets) from the CPU to the South bridge.

Particularly, certain protocols, such as HyperTransport™, utilize two types of memory write commands in memory write requests. In the example of HyperTransport™, in particular, it is known to utilize both "posted" and "non-posted" memory write commands. Posted commands are simply sent from a CPU to a Southbridge via a Northbridge, for example, without the need for a return acknowledgment. On the other hand, non-posted commands require that the receiving device issue an acknowledgement that the memory write request with the non-posted command has been made. PCI Express, on the other hand, only utilizes the concept of the equivalent of posted memory write requests of HyperTransport™ protocol. This difference becomes particularly problematic with Southbridges incorporating an internal bridge to a low pin count (LPC) interface, which is an interface that may connect to devices having both slave and/or master interfaces and also converts to LPC protocols.

The LPC protocol, however, does not account for or allow memory write requests to be retried with the master interfaces. In particular, once a bus master is granted control of the LPC interface, it will not release the interface before a transaction or write request is successfully completed. When the Southbridge grants an external LPC interface master control of the interface, the Southbridge is unable to service transactions, namely memory write requests, from the CPU that are targeting a particular device connected to the LPC interface. Thus, when the LPC interface master is performing direct memory access reads from a main system memory, it is possible that the CPU may also be performing "posted" memory write requests to another device connected to the LPC interface. However, because the LPC interface master "owns" the LPC interface at the time, the posted memory write requests cannot be completed. This situation is further complicated in that known ordering rules for such interfaces prevent read response data from passing the posted memory write requests, which may result in deadlock of the Southbridge as well as the entire computing system.

It is noted that the following documents are known in the art concerning HyperTransport™ technology and PCI and their functioning. The following documents are incorporated herein by reference:
1) "HyperTransport™ I/O Link Specification, Revision 1.05c"; Document #HTC2002104-0005-0005; Aug. 5, 2003; HyperTransport Technology Consortium.
2) "HyperTransport™ I/O Link Errata, Revision 1.05b"; Document #HTC200335-0024-0003; Apr. 2, 2003, HyperTransport Technology Consortium.
3) "Advanced Configuration and Power Interface Specification, Revision 2.0b;" Oct. 11, 2002; Compaq Computer Corporation, Intel Corporation, Microsoft Corporation, Phoenix Technologies Ltd., and Toshiba Corporation.
4) "AMD-8151™ HyperTransport™ AGP3.0 Graphics Tunnel Data Sheet;" 24888 Rev 3.03-Jul. 12, 2004; Advanced Micro Devices, Inc.
5) "Clock Generator Specification for AMD64 Processors;" Publication #24707 Revision: 3.08; September 2003; Advanced Micro Devices, Inc.
6) "HyperTransport™ Technology I/O Link—A High-Bandwidth I/O Architecture;" Jul. 20, 2001; Advanced Micro Devices, Inc.

DETAILED DESCRIPTION OF THE PRESENT EMBODIMENTS

Figure 1:
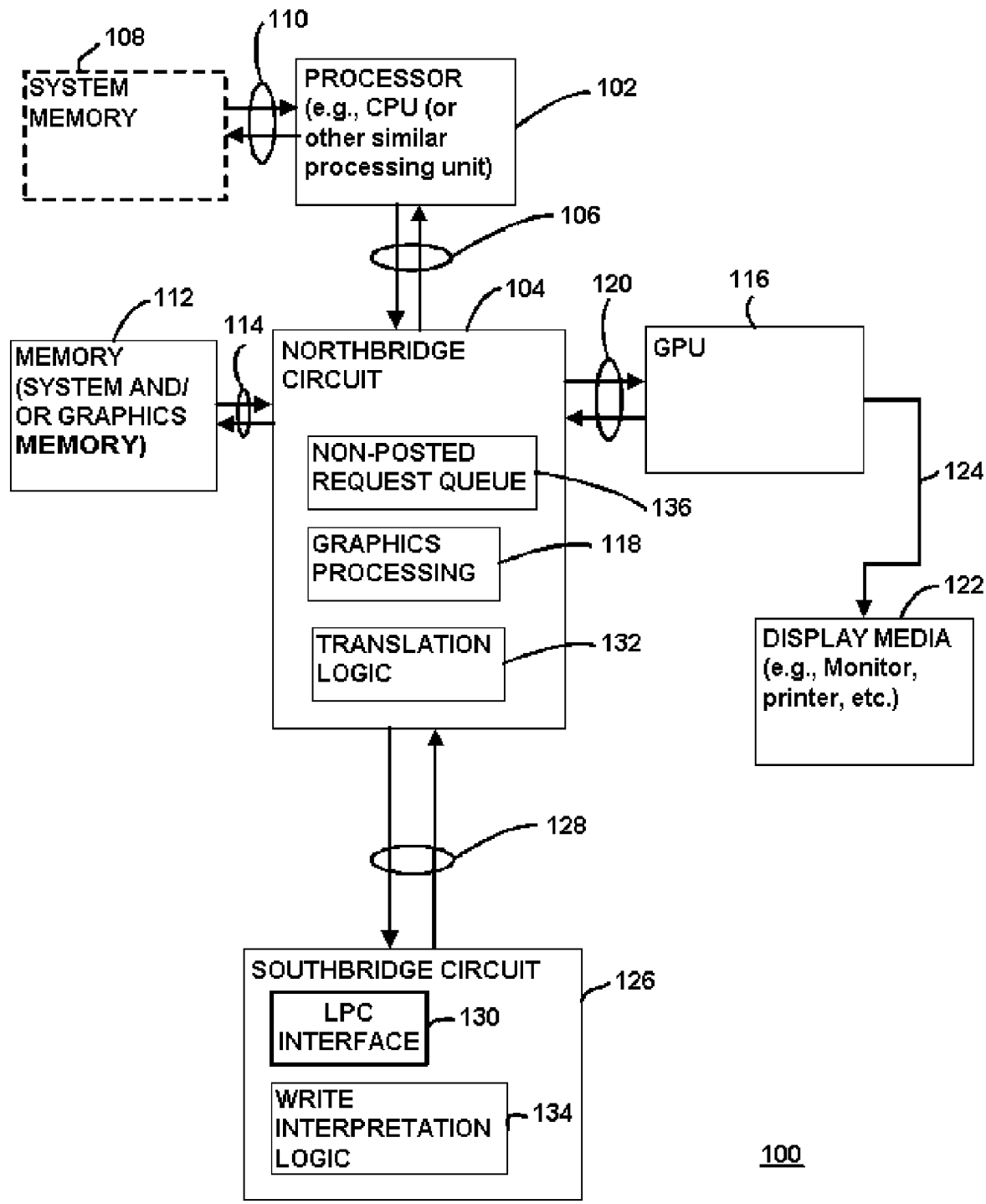
FIG. 1 illustrates an example of a computing system in accordance with the present disclosure.

The present disclosure relates to methods and apparatus to translate memory write requests to be transmitted from a first processor to a second processor in a computing system, such as between a CPU and a Southbridge, as an example. An example of a disclosed method includes generating a memory write request using a second protocol responsive to a memory write request of a first protocol from the first processor, the first protocol supporting a first memory write command type and a second memory write command type, the second protocol supporting only the first memory write command type. The method also includes inserting a predefined code in the generated memory write request of the second protocol to produce a translated memory write request. The method may also include first receiving the memory write request from the first processor where the memory write request is operable according to the first protocol having at least first and second memory write command types. The second protocol only recognizes the first memory write command type of the first protocol and does not recognize the memory write command types of the second memory request format.

Additionally, apparatus are disclosed for translating memory write requests transmitted from the first processor to a second processor in a computing system, which includes a bridge circuit having an interface configured to receive the memory write request from the first processor where the memory write requests are operable according to a first protocol having at least first and second memory write command types. The bridge circuit also includes logic operable to generate a write command request using a second protocol in response to a memory write request of a first protocol, the first protocol supporting a first memory write command type and a second memory write command type, the second protocol supporting only the first memory write command type. The logic is also operative to insert a predefined code into the write request in order to translate the request of the first protocol to a second write request of the second protocol where the second protocol only recognizes the first memory write command type of the first protocol and does not recognize the second memory write command type.

The disclosed methods and apparatus for translating memory write requests, (e.g. a HyperTransport™ packet with a write command therein indicating the packet is for a memory write operation) transmitted from a first processor to a second processor are useful to allow a first processor, such as a CPU, utilizing a packet protocol for sending multiple types of memory requests (e.g., posted and non-posted memory write requests in HyperTransport™ that are posted and non-posted memory write commands in the packets) to another processor in a computing system, such as a Southbridge, via a Northbridge circuit, which communicates to the Southbridge via a second protocol, such as PCI Express. Furthermore, in Southbridge circuits employing low pin count (LPC) interfaces, the addition of a predetermined code inserted into PCI Express formatted memory write requests from the Northbridge to the Southbridge allows the Southbridge to receive non-posted memory requests. In particular, the predefined code tells the Southbridge to send an acknowledgement that is translated by the Northbridge and sent to the CPU in order to ensure that the Southbridge and CPU are not causing the system to get stuck.

FIG. 1 illustrates an example of a computer system 100 in which the presently-disclosed apparatus and methods may be utilized. As shown, the system 100 includes a processor 102, which may be a central processing unit (CPU), multiple processors, or any other similar processing unit. The processor 102 is interfaced to a bridge circuit, such as a memory interface bridge, host bridge, or a Northbridge 104 via an interface 106. In particular, for purposes of example, this interface 106 operates according to the HyperTransport™ protocol, but may be any other suitable interface in which write commands are of the posted and non-posted type. The system 100 also may include a system memory 108 connected directly to the processor 102 with an interface 110, such as an interface operating according to PCI Express, PCI, AGP or any other suitable interface standard.

The Northbridge circuit 104 is also connected to a memory 112, which may be a system memory and also may include graphics memory or simply the graphics memory utilized by a graphics processing unit 116 connected to the Northbridge 104 or graphics processing circuitry 118 internal to the Northbridge circuit 104. The memory 112 is interfaced with the Northbridge 104 via an interface 114, which may operate according to DDR1/DDR2 or any other suitable standard for interfacing with memory. Additionally, the graphics processing unit 116 is interfaced by an interface 120 with the Northbridge circuit 104 and also may operate according to any suitable standard, such as PCI, PCI Express or AGP or other suitable communication system that utilizes only posted memory write commands. The graphics processing unit 116 may drive a display media 122, such as a monitor, printer, or any other suitable display device 122 via an analog bus 124.

The Northbridge circuit 104, as shown in FIG. 1 also interfaces with a Southbridge circuit, which may be used to interface with any one of numerous types of devices, such as keyboards, mouse devices, hard drives, floppy drives, USB devices, ROMs and PCI bus cards. The Northbridge 104 and Southbridge 126 are interfaced with an interface 128, which may operate according to any suitable standard. For purposes of the present disclosure, the interface 128 operates according to PCI Express or any other suitable equivalent interface protocol that, for example, utilizes only posted memory write commands.

The Southbridge circuit 126 also includes a low pin count (LPC) interface 130, which is used to interface any number of output devices to the Southbridge circuit 126. The LPC interface 130 operates according to the low pin count interface standard developed by Intel as defined in, for example, "Intel Low Pin Count (LPC) Interface Specification," Revision 1.1., Document No. 251289-001, August 2003, which is incorporated herein by reference.

Particular to the presently disclosed methods and apparatus, the Northbridge circuit 104 includes translation logic 132 that is used to translate or correlate between requests and messages from the CPU 102 via interface 106 operating according to HyperTransport™ protocol and the interface 128 between the Northbridge 104 and Southbridge 126 operating according to PCI Express, for example. Furthermore, the Southbridge circuit 126 includes write interpretation logic 134 that is used, for example, to effect acknowledgement of memory write requests from the CPU, which have been translated by the translation logic 132 in the Northbridge circuit 104.

It is also noted that the translation logic 132 and write interpretation logic 134 may be comprised of hardware, firmware or software. In the case of firmware or software, logic 132 may be executable instructions stored in a memory, such as memory 108 or memory 112 (or a memory within the Northbridge circuit 104), or a combination of a number of different memories in computer system 100 such that when processed by the one or more processors (e.g., CPU 102, Northbridge circuit 104, Southbridge 126 or any combination of processing devices) will perform the translation.

Translation logic 132 may also be configured to translate memory write requests issued by the CPU 102 to the Southbridge circuit 126. As discussed previously, under HyperTransport™ protocol, two types of memory requests may be issued according to the standard-posted and non-posted memory write commands. However, as discussed previously, PCI Express, according to the standard, only recognizes the equivalent of posted memory write requests.

As discussed previously, the LPC bus or interface 130 can have devices with both slave and/or master interfaces. However, the LPC protocol does not allow for retrying bus masters. Once a bus master has been granted the LPC bus, it will not release the bus before a transaction is successfully completed. Once the Southbridge circuit 126 grants an external LPC bus master control of the LPC bus, the Southbridge circuit 126 will not be able to service transactions from the CPU 102 that target an LPC device. When an LPC bus-master is performing direct memory access (DMA) reads from main memory (e.g., memory 108), it is possible that the CPU 102 is also performing posted writes to another LPC device. Since the LPC bus-master "owns" the LPC bus, the posted writes cannot complete. Normal ordering rules prevent read-response data from passing posted write requests, which result in deadlock.

Thus, in the presently disclosed system all transactions targeting the LPC bus or interface 130 are placed into a non-posted request queue 136, which is shown within the Northbridge circuit 104. Consequently, DMA read responses can pass the non-posted memory write requests. In order to ensure correct operation, the concept of non-posted memory writes must also be extended across the PCI Express interface 128 from the Northbridge circuit 104 to the Southbridge circuit 126. This is achieved by defining a specific transaction type or command type (e.g. changing content of a type field to indicate a non-posted memory write command) in the PCI Express packets with the translation logic 132 for non-posted memory writes (e.g., Type [4:0]=0_1110), while all other fields in PCI Express packets transmitted from the Northbridge circuit 104 to the Southbridge circuit 126 are defined the same as a posted memory write (e.g., 0_0000 as illustrated in Table 2-52-3 of the PCI Express specification). Hence, the PCT Express packet format is used to accommodate non-posted write commands. It is noted that in an example of translation of non-posted memory write requests according to the present disclosure, the HyperTransport requests (which are, at maximum, 64 bytes) may be split down to one PCI Express dword packet consisting of 4 bytes. Because the Southbridge circuit 126 must save the write request in holding registers in the event the LPC bus is busy, reducing the packet to one dword minimizes the amount of holding register storage required in the Southbridge circuit 126.

In the Northbridge circuit 104 and the Southbridge circuit 126, these specific memory write transactions are then configured to follow the same path as posted writes, and a completion acknowledgement is returned from the write interpretation logic 134 in the Southbridge circuit 126 to the Northbridge circuit 104. The write interpretation logic 134 in the Southbridge circuit 126 will only send an acknowledgement once the LPC interface 130 write is completed. Otherwise, the Northbridge circuit 104 would attempt to send further non-posted writes to the LPC interface 130. Any non-posted memory write request not targeting the LPC interface 130 is converted to a posted write and acknowledged by the Northbridge circuit 104.

Figure 2:
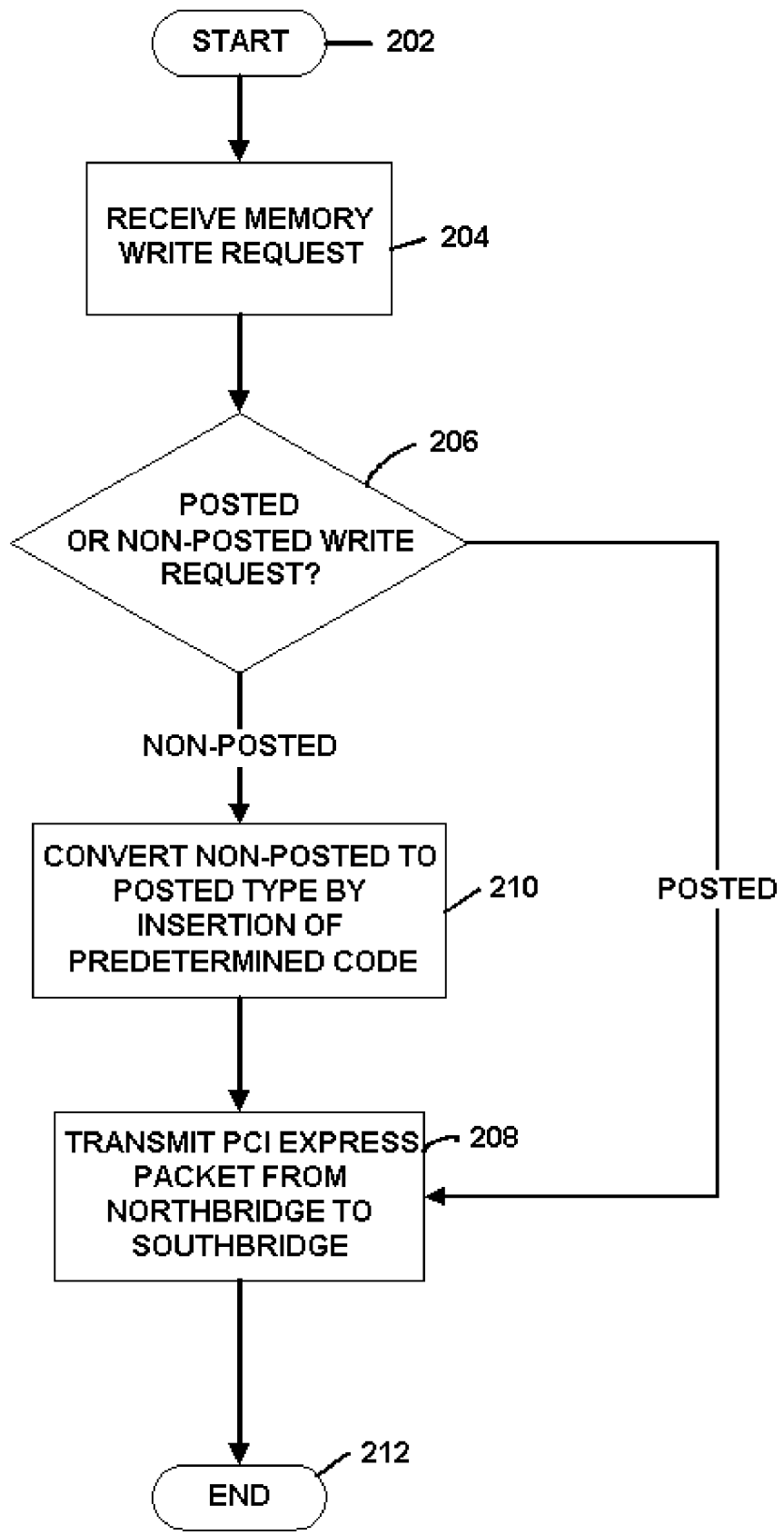
FIG. 2 illustrates an exemplary flow diagram of a method used to translate non-posted memory write requests from a CPU to a Southbridge in accordance with the present disclosure.

FIG. 2 illustrates a flow diagram of the processes by which the translation logic 132 follows to convert non-posted memory write requests from the CPU 102 to the Southbridge 126. As illustrated, the process 200 is initialized at block 202. Flow then proceeds to block 204 where the logic 132 receives a memory write request from the CPU 102. It is noted that the memory write request may be a request with either a posted write command or a non-posted write command therein. Flow then proceeds to decision block 206 where the logic 132 determines whether or not the message is a posted or non-posted type (contains a posted or non-posted write command). If the message is determined at block 206 to be a posted type, flow proceeds to block 208 where logic 132 simply transmits the message write request to the Southbridge circuit via PCI Express bus 128.

Alternatively, at block 206, if the logic 132 determines that the message is of a non-posted type, flow proceeds to block 210 where logic 132 generates a write command request in a second protocol responsive to the non-posted message type and inserts a predetermined code recognizable by PCI Express and that is also recognizable by write interpretation logic 134 in the Southbridge circuit 126. Flow then proceeds to block 608 where the request is transmitted from the Northbridge 104 to the Southbridge 126. The process then ends as shown at block 612.

As discussed in the foregoing description, the disclosed methods and apparatus for translating memory write requests transmitted from a first processor to a second processor are useful to allow a first processor, such as a CPU, utilizing a protocol for sending multiple types of memory requests (e.g., posted and non-posted command write requests in Hyper-Transport™) to another processor in a computing system, such as a Southbridge, via a Northbridge circuit, which communicates to the Southbridge via a second protocol, such as PCI Express. Furthermore, in Southbridge circuits employing low pin count (LPC) interfaces, the addition of a predetermined code inserted into PCI Express formatted memory write requests from the Northbridge to the Southbridge allows the Southbridge to receive non-posted memory requests. The write interpretation logic 134 includes logic to interpret the predefined code. In particular, the predefined code may be data in a type field of the packet and tells the Southbridge to send an acknowledgement that is translated by the Northbridge and sent to the CPU in order to ensure that the Southbridge and CPU are not causing the system to get stuck.

The above detailed description of the examples described herein have been presented for the purposes of illustration and description only and not by limitation. It is therefore contemplated that the present application cover any and all modifications, variations or equivalents that fall within the spirit and scope of the basic underlying principles disclosed above and the appended claims.

What is claimed is:

1. A method for translating memory write requests transmitted from a first processor to a second processor comprising:
generating a memory write request using a second protocol in response to a memory write request of a first protocol from the first processor, said first protocol supporting a posted memory write command type and a non-posted memory write command type, said second protocol supporting only said posted memory write command type, wherein posted write commands do not require a return acknowledgement and wherein non-posted write commands require a return acknowledgement; and
inserting a predefined code in said generated memory write request of said second protocol, thereby creating a translated memory write request, wherein said predefined code instructs said second processor to send an acknowledgement to said first processor acknowledging that said memory write request has been received.

2. The method as defined in claim 1, wherein the predefined code is entered in a field of a generated memory write request packet and is configured to define a command type for the translated memory write request as a non-posted memory write command, and all other fields in the generated memory write request packet are defined according to a posted memory write command according to the second protocol.

3. The method as defined in claim 1, wherein the first processor is a central processing unit and the second processor is a Southbridge and translation is performed in a Northbridge connected to the central processing unit by an interface operable according to the first protocol and connected to the Southbridge by an interface operable according to the second protocol.

4. The method as defined in claim 3, further comprising:
receiving the memory write request of the first protocol from the first processor; and
transmitting the translated memory write request from the Northbridge to the Southbridge.

5. The method as defined in claim 4, further comprising receiving an acknowledgement message from the Southbridge by the Northbridge in response to the transmitted translated write request.

6. The method as defined in claim 3, wherein the Southbridge includes a low pin count bus.

7. The method as defined in claim 3, wherein the Southbridge is configured to queue the translated memory write request based on the predefined code and to signal the Northbridge upon completion of the translated memory write request.

8. An apparatus for translating memory write requests transmitted from a first processor to a second processor comprising:
a bridge circuit including logic operable to:
generate a memory write request using a second protocol in response to a memory write request of a first protocol from the first processor, said first protocol supporting a posted memory write command type and a non-posted memory write command type, said second protocol supporting only said posted memory write command type, wherein posted write commands do not require a return acknowledgement and wherein non-posted write commands require a return acknowledgement; and
insert a predefined code in said generated memory write request in said second protocol, thereby creating a translated memory write request, wherein said predefined code instructs said second processor to send an acknowledgement to said first processor acknowledging that said memory write request has been received.

9. The apparatus as defined in claim 8 comprising an interface configured to receive the memory write request of the first protocol.

10. The apparatus as defined in claim 8, wherein the predefined code is entered in a field of a generated memory write request packet and defines a command type for the translated memory write request as a non-posted memory write command, and all other fields in the generated memory write request packet are defined according to a posted memory write command according to the second protocol.

11. The apparatus as defined in claim 8, wherein the first processor is a central processing unit and the second processor is a Southbridge and the bridge circuit is a Northbridge connected to the central processing unit by an interface operable according to the first protocol and connected to the Southbridge by an interface operable according to the second protocol.

12. The apparatus as defined in claim 11, wherein the Northbridge is further configured to transmit the translated memory write request from the Northbridge to the Southbridge.

13. The apparatus as defined in claim 11, wherein the Northbridge is further configured to receive an acknowledgement message from the Southbridge by the Northbridge in response to the transmitted translated memory write request.

14. The apparatus as defined in claim 11, wherein the Southbridge includes a low pin count bus.

15. The apparatus as defined in claim 11, wherein the Southbridge is configured to queue the translated memory write request based on the predefined code and to signal the Northbridge upon completion of the translated memory write request.

16. Memory containing executable instructions such that when processed by one or more processors causes the one or more processors to:
generate a memory write request using a second protocol in response to a memory write request of a first protocol, said first protocol supporting a posted memory write command type and a non-posted memory write command type, said second protocol supporting only said posted memory write command type, wherein posted write commands do not require a return acknowledgement and wherein non-posted write commands require a return acknowledgement; and
insert a predefined code in said generated memory write request in said second protocol, thereby creating a translated memory write request, wherein said predefined code instructs a processor that receives said generated memory write request to said acknowledgement to acknowledge that said memory write request has been received.

17. The memory as defined in claim 16, wherein the predefined code is entered in a field of a generated memory write request packet and is configured to define a command type for the translated memory write request as a non-posted memory write command, and all other fields in the generated memory write request packet are defined according to a posted memory write command according to the second protocol.

18. The memory as defined in claim 16, wherein the first processor is a central processing unit and the second processor is a Southbridge and translation is performed in a Northbridge connected to the central processing unit by an interface operable according to the first protocol and connected to the Southbridge by an interface operable according to the second protocol.

19. The memory as defined in claim 18, wherein the memory further contains executable instructions such that when processed by the one or more processors causes the one or more processors to:
receive the memory write request of the first protocol; and
transmit the translated memory write request from the Northbridge to the Southbridge.

20. The memory as defined in claim 19, wherein the memory further contains executable instructions such that when processed by the one or more processors causes the one or more processors to receive an acknowledgement message from the Southbridge in the Northbridge in response to the generated memory write request.

21. The memory as defined in claim 20, wherein the Southbridge includes a low pin count bus.

22. The memory as defined in claim 20, wherein the Southbridge is configured to queue the translated memory write request based on the predefined code and to signal the Northbridge upon completion of the translated memory write request.

23. An apparatus for processing memory write requests transmitted from a first processor to a second processor comprising:
logic operative to interpret a predefined code in a memory write request generated using a second protocol responsive to a memory write request of a first protocol, said first protocol supporting a posted memory write command type and a non-posted memory write command type, said second protocol supporting only said posted memory write command type, the logic also operative to send an acknowledgment in response to interpreting the predefined code.

24. The apparatus of claim 23 wherein the sent acknowledgment indicates that the memory write request is a non-posted memory write request.

25. A method for processing memory write requests transmitted from a first processor to a second processor comprising:
interpreting a predefined code in a memory write request generated using a second protocol responsive to a memory write request of a first protocol, said first protocol supporting a posted memory write command type and a non-posted memory write command type, said second protocol supporting only said posted memory write command type, and sending an acknowledgment in response to interpreting the predefined code, wherein the sent acknowledgement indicates that the memory write request is a non-posted memory write request.

* * * * *